US008571962B1

(12) United States Patent
West

(10) Patent No.: US 8,571,962 B1
(45) Date of Patent: Oct. 29, 2013

(54) SYSTEMS AND METHODS FOR AUTOMATICALLY REINVESTING CERTIFICATE OF DEPOSITS WITH AN INCREASE OF THE INVESTMENT

(75) Inventor: Billie Jean West, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 472 days.

(21) Appl. No.: 12/492,286

(22) Filed: Jun. 26, 2009

(51) Int. Cl.
*G06Q 40/06* (2012.01)
*G06Q 40/00* (2012.01)
*G06Q 40/02* (2012.01)
*G06Q 20/10* (2012.01)
*G06Q 40/04* (2012.01)

(52) U.S. Cl.
USPC ............... 705/36 R; 705/35; 705/39; 705/37; 379/265.06

(58) Field of Classification Search
CPC ....... G06Q 40/06; G06Q 40/00; G06Q 40/02; G06Q 20/10; G06Q 40/04
USPC .................. 705/35, 36, 36 R, 39, 42, 51, 37; 709/224; 710/54, 200; 379/265.06
See application file for complete search history.

(56) References Cited

U.S. PATENT DOCUMENTS

| | | | | | |
|---|---|---|---|---|---|
| 4,482,956 | A | * | 11/1984 | Tallman | 710/200 |
| 4,807,111 | A | * | 2/1989 | Cohen et al. | 710/54 |
| 5,745,885 | A | * | 4/1998 | Mottola et al. | 705/36 R |
| 5,809,484 | A | * | 9/1998 | Mottola et al. | 705/36 R |
| 5,911,136 | A | * | 6/1999 | Atkins | 705/36 R |
| 7,756,767 | B2 | * | 7/2010 | Cluse et al. | 705/36 R |
| 8,140,419 | B2 | * | 3/2012 | Stanley | 705/35 |
| 2002/0046144 | A1 | * | 4/2002 | Graff | 705/36 |
| 2002/0059123 | A1 | | 5/2002 | Dunning et al. | |
| 2003/0028483 | A1 | * | 2/2003 | Sanders et al. | 705/40 |
| 2004/0010462 | A1 | * | 1/2004 | Moon et al. | 705/39 |
| 2005/0015205 | A1 | * | 1/2005 | Repucci et al. | 702/10 |
| 2005/0108120 | A1 | * | 5/2005 | Malka et al. | 705/35 |
| 2005/0108154 | A1 | * | 5/2005 | McLiesh et al. | 705/39 |
| 2005/0160019 | A1 | * | 7/2005 | Cluse et al. | 705/35 |
| 2005/0289037 | A1 | * | 12/2005 | Smith et al. | 705/36 |
| 2006/0143103 | A1 | * | 6/2006 | Denne et al. | 705/35 |
| 2006/0293985 | A1 | * | 12/2006 | Lederman et al. | 705/35 |
| 2007/0118451 | A1 | * | 5/2007 | Schneider | 705/36 R |
| 2007/0143196 | A1 | * | 6/2007 | Colvin | 705/35 |
| 2007/0143199 | A1 | * | 6/2007 | Stiff et al. | 705/36 R |
| 2007/0156594 | A1 | * | 7/2007 | McGucken | 705/51 |

(Continued)

OTHER PUBLICATIONS

Anonymous, Certificate of Deposit, CD Ladder—Learn the CD Ladder, SaveWealth™ Financial, Aug. 11, 2003, pp. 1-2.*

(Continued)

*Primary Examiner* — Barbara Joan Amelunxen
(74) *Attorney, Agent, or Firm* — Perkins Coie LLP

(57) ABSTRACT

A system implemented on one or more computer processors may comprise at least one subsystem configured for automatically purchasing a first certificate of deposit for an investor for a specified amount of money having a predetermined term, at least one subsystem configured for waiting a predetermined period of time no longer than the term of the first certificate of deposit, at least one subsystem configured for automatically purchasing another certificate of deposit for an investor for the specified amount of money and having the same predetermined term, at least one subsystem configured for repeating actions for which each subsystem above is configured until a second specified amount of money has been spent.

18 Claims, 7 Drawing Sheets

(56) References Cited

U.S. PATENT DOCUMENTS

| | | |
|---|---|---|
| 2007/0162365 A1 | 7/2007 | Weinreb |
| 2007/0294167 A1* | 12/2007 | Stanley .......................... 705/42 |
| 2008/0016008 A1 | 1/2008 | Siegel et al. |
| 2008/0301282 A1* | 12/2008 | Coleman ...................... 709/224 |
| 2008/0319885 A1* | 12/2008 | D'Anna et al. ................. 705/35 |
| 2009/0198630 A1* | 8/2009 | Treitler et al. .............. 705/36 R |

OTHER PUBLICATIONS

"Sundaram Floating Rate Fund", Sundaram Mutual, 40 pages.

* cited by examiner

SYSTEMS AND METHODS FOR AUTOMATICALLY REINVESTING CERTIFICATE OF DEPOSITS WITH AN INCREASE OF THE INVESTMENT

BACKGROUND

For many average consumers, putting money in Certificates of Deposit (CD) is difficult and stressful. The consumer puts the money away and has no access to the entirety of that deposit until the CD matures. Thus, many people do not want to invest in CDs because they are afraid they will not be able to access their money when they need it. Many consumers would still like to have the security and interest rate of a CD, but would also like to have at least access to some of the money invested before the maturity date without giving up all the benefits of the CD. Currently, there exists no such processes or system for facilitating offering a single investment vehicle fulfilling these needs.

In this regard, there is a need for systems and methods that overcome the shortcomings described above and others.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In consideration of the above-identified shortcomings of the art, systems and methods for automatic certificate of deposit investing are described herein. For several embodiments, a system implemented on one or more computer processors may comprise at least one subsystem configured for automatically purchasing a first certificate of deposit for an investor for a specified amount of money having a predetermined term, at least one subsystem configured for waiting a predetermined period of time no longer than the term of the first certificate of deposit, at least one subsystem configured for automatically purchasing another certificate of deposit for an investor for the specified amount of money and having the same predetermined term, at least one subsystem configured for repeating actions for which each subsystem above is configured until a second specified amount of money has been spent.

Other features and embodiments are described below.

BRIEF DESCRIPTION OF THE DRAWINGS

Systems and methods for automatic certificate of deposit investing are further described with reference to the accompanying drawings in which.

DETAILED DESCRIPTION

Certain specific details are set forth in the following description and figures to provide a thorough understanding of various embodiments. Certain well-known details often associated with computing and software technology are not set forth in the following disclosure to avoid unnecessarily obscuring the various embodiments. Further, those of ordinary skill in the relevant art will understand that they can practice other embodiments without one or more of the details described below. Finally, while various methods are described with reference to steps and sequences in the following disclosure, the description as such is for providing a clear implementation of various embodiments, and the steps and sequences of steps should not be taken as required to practice the embodiments.

Figure 1:
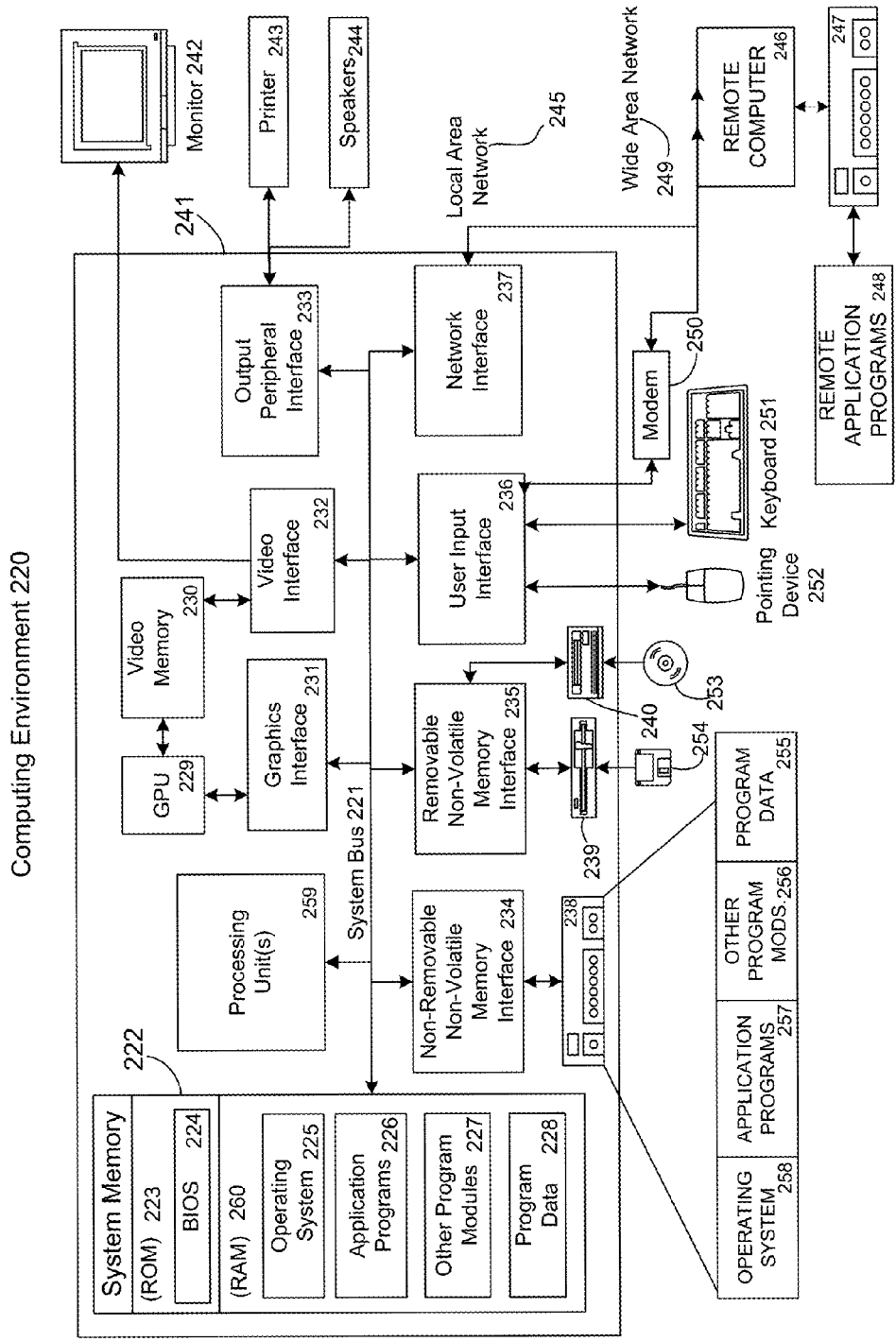
FIG. 1 is a block diagram representing an exemplary computing environment suitable for use in conjunction with implementing systems and methods for automatic certificate of deposit investing.

Referring next to FIG. 1, shown is a block diagram representing an exemplary computing environment suitable for use in conjunction with implementing the processes described below. For example, the computer-executable instructions that carry out the processes and methods for automatic certificate of deposit investing may reside and/or be executed in such a computing environment as shown in FIG. 1. The computing environment 220 is only one example of a suitable computing environment and is not intended to suggest any limitation as to the scope of use or functionality of the embodiments. Neither should the computing environment 220 be interpreted as having any dependency or requirement relating to any one or combination of components illustrated in the exemplary computing environment 220. For example a mobile device may also include one or more items such as those described below for use in conjunction with implementing the processes described below.

Aspects of the embodiments are operational with numerous other general purpose or special purpose computing environments or configurations. Examples of well known computing systems, environments, and/or configurations that may be suitable for use with the embodiments include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the embodiments may be implemented in the general context of computer-executable instructions, such as program modules, being executed by a computer. Generally, program modules include routines, programs, objects, components, data structures, etc. that perform particular tasks or implement particular abstract data types. Aspects of the embodiments may also be practiced in distributed computing environments where tasks are performed by remote processing devices that are linked through a communications network. In a distributed computing environment, program modules may be located in both local and remote computer storage media including memory storage devices.

An exemplary system for implementing aspects of the embodiments includes a general purpose computing device in the form of a computer 241. Components of computer 241 may include, but are not limited to, a processing unit 259, a system memory 222, a graphics interface 231, a graphics processing unit (GPU) 229, video memory 230, video interface 232 and a system bus 221 that couples various system components including the system memory 222 to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and include both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, random access memory (RAM), read-only memory (ROM), Electrically Erasable Programmable Read-Only Memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. By way of example, and not limitation, communication media include wired media such as a wired network or direct-wired connection, and wireless media such as acoustic, radio frequency (RF), infrared and other wireless media. Combinations of the any of the above should also be included within the scope of computer readable media.

The system memory 222 includes computer storage media in the form of volatile and/or nonvolatile memory such as ROM 223 and RAM 260. A basic input/output system (BIOS) 224, containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 1 provide storage of computer readable instructions, data structures, program modules and other data for the computer 241. In FIG. 1, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus 221, but may be connected by other interface and bus structures, such as a parallel port, game port or a universal serial bus (USB). A monitor 242 or other type of display device is also connected to the system bus 221 via an interface, such as a video interface 232. In addition to the monitor 242, computer 241 may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 1. The logical connections depicted in FIG. 1 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device 247. By way of example, and not limitation, FIG. 1 illustrates remote application programs 248 as residing on the remote memory storage device 247. It will be appreciated that the network connections shown are exemplary and other means of establishing a communications link between the computers may be used.

It should be understood that the various techniques described herein may be implemented in connection with hardware or software or, where appropriate, with a combination of both. As used herein a "system" or "subsystem" may comprise one or more of, or any combination of, the following: mechanical devices, hardware, components of hardware, circuits, circuitry, logic design, logical components, software, software modules, components of software or software modules, software procedures, software instructions, software routines, software objects, software functions, software classes, software programs, files containing software, etc., to perform the intended function of the system or subsystem. Thus, the methods and apparatus of the embodiments, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the embodiments. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the embodiments, e.g., through the use of an application programming interface (API), reusable controls, or the like. Such programs are preferably implemented in a high level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the embodiments in the context of one or more stand-alone computer systems, the embodiments are not so limited, but rather may be implemented in connection with any computing environment, such as a network or distributed computing environment. Still further, aspects of the embodiments may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

Figure 2:
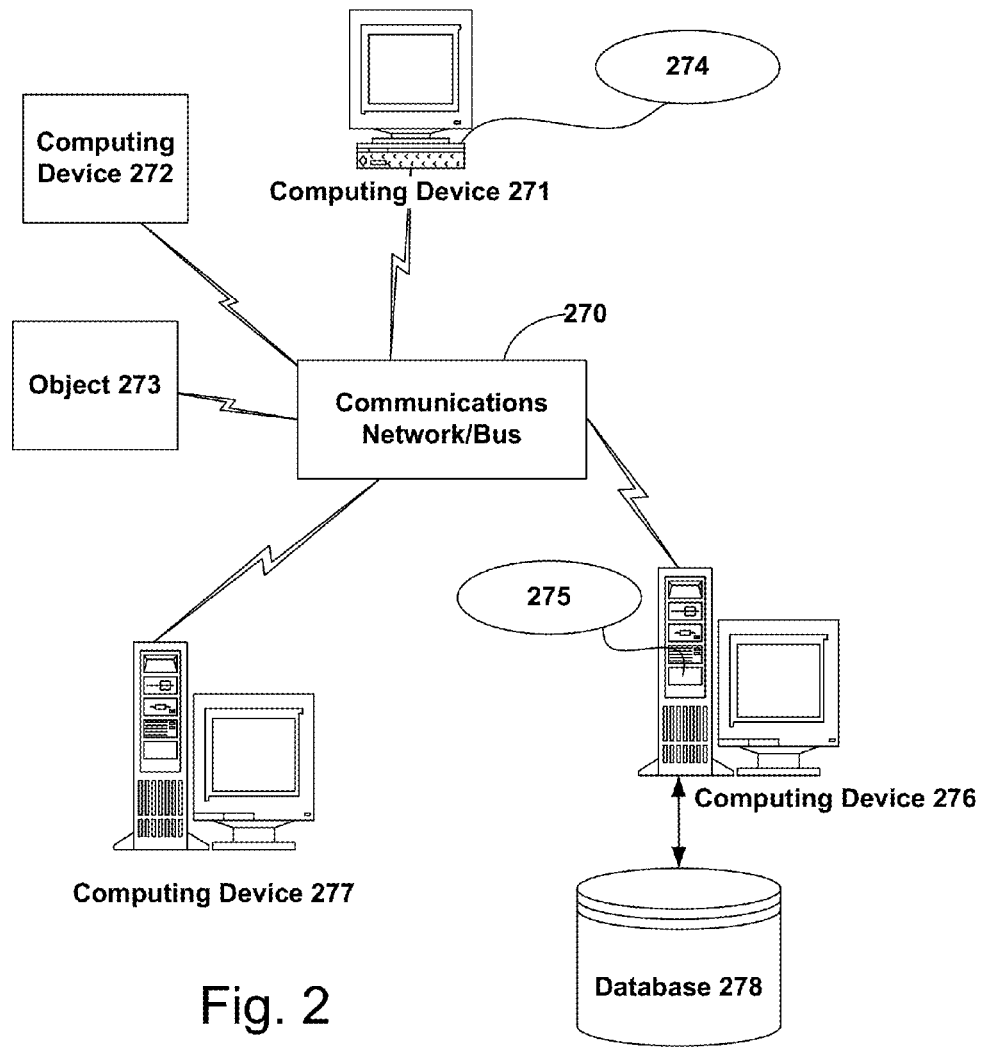
FIG. 2 illustrates an exemplary networked computing environment in which many computerized processes may be implemented to perform automatic certificate of deposit investing.

Referring next to FIG. 2, shown is an exemplary networked computing environment in which many computerized processes may be implemented to perform the processes described below. For example, distributed or parallel computing may be part of such a networked environment with various clients on the network of FIG. 2 using and/or implementing systems and methods for automatic certificate of deposit investing. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2, and may itself represent multiple interconnected networks. In accordance with aspects of the embodiments, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 2 and the further diversification that can occur in computing in a network environment such as that of FIG. 2, the systems and methods provided herein cannot be construed as limited in any way to a particular computing architecture. Instead, the embodiments should be construed in breadth and scope in accordance with the appended claims.

Figure 3:
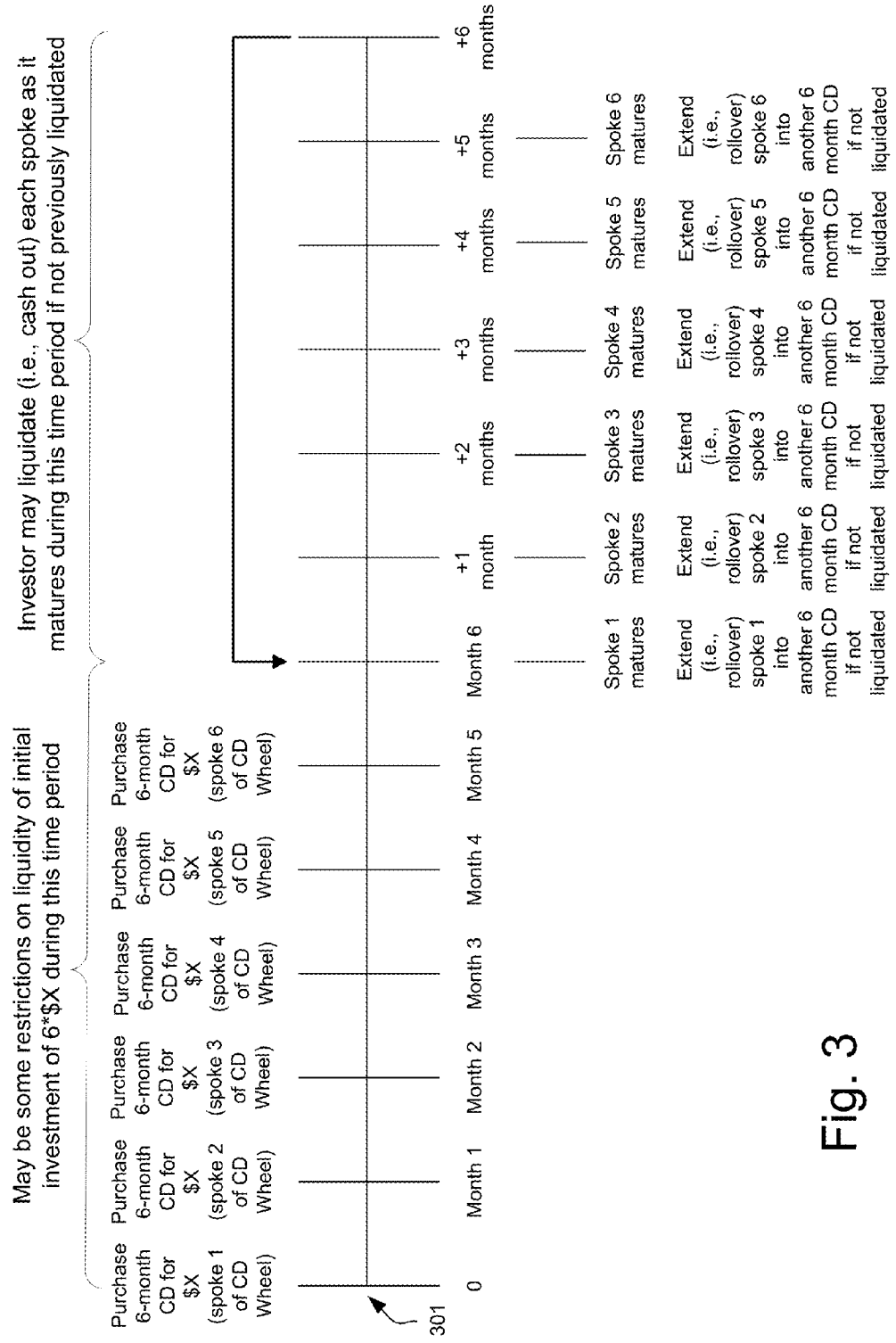
FIG. 3 is a timeline chart illustrating an example operation of a process for automatic certificate of deposit investing over time.

Referring next to FIG. 3 shown is a timeline chart illustrating an example operation of a process for automatic certificate of deposit investing over time. The process for automatic certificate of deposit investing over time described herein utilizes an automated certificate of deposit (CD) investing device that operates on a wheel concept. Thus, this device is referred to herein as a "CD wheel". For example an investor would invest an amount of funds into this device, which would then distribute equally over time a portion of the total investment into longer term CD's (giving the investor the higher interest rate associated with a longer term CD). After the maturity date of the first CD purchased, every month (or whatever sub-period is set), a portion of the entire investment is available for liquidation as each underlying CD matures. For example, $6,000 invested in a 6 month CD wheel would result in automatically investing $1,000 every month, which would be available for liquidation every month after the first maturity date.

The timeline in FIG. 3, uses a 6-month CD wheel as an example. The underlying automatic investment process will purchase a 6-month CD in the amount of $X every month for 6 months. Each CD purchased every month is considered a "spoke" in the CD wheel and may be referred to as such hereinafter. Therefore, 6 months from the date of purchase of the first spoke, it will mature and the investor will have the option to liquidate (i.e., cash out) the spoke (receiving $X plus interest) or have it automatically extended (i.e., rolled over) into another CD of the same amount and term. Thus, as each spoke matures, this option will be available to the investor and the investor can, among other possible options, choose to liquidate the spoke or have it automatically extended and automatically reinvest the value of the spoke into another CD of the same term. The term, dollar amount, and sub-periods at which each spoke is purchased are variable and may be selected by the investor. Such variables may be automatically adjusted according to selections made by the investor when applying for or purchasing the CD wheel investment (e.g., through an online web interface).

If the investor chooses to liquidate a spoke, then the funds may be automatically transferred to an account of the investors choosing. Another option that may be available is that the investor may choose to reinvest only the principal balance of the spoke and withdraw the earned interest only. There also may be restrictions put on the initial investment (6*$X in the example provided in FIG. 3). Such restrictions may include restricting the availability to withdraw the initial investment before the maturity date of the first spoke or imposing penalties for withdrawing the initial investment before the maturity date of the first spoke. Also, if the investor withdraws over a certain amount of the initial investment, the spokes of the CD wheel already purchased may be converted into traditional CDs and the CD wheel dissolved. Such restrictions or penalties, however, may result in a lower interest rate available to the investor for purchasing the CD wheel.

Figure 4:
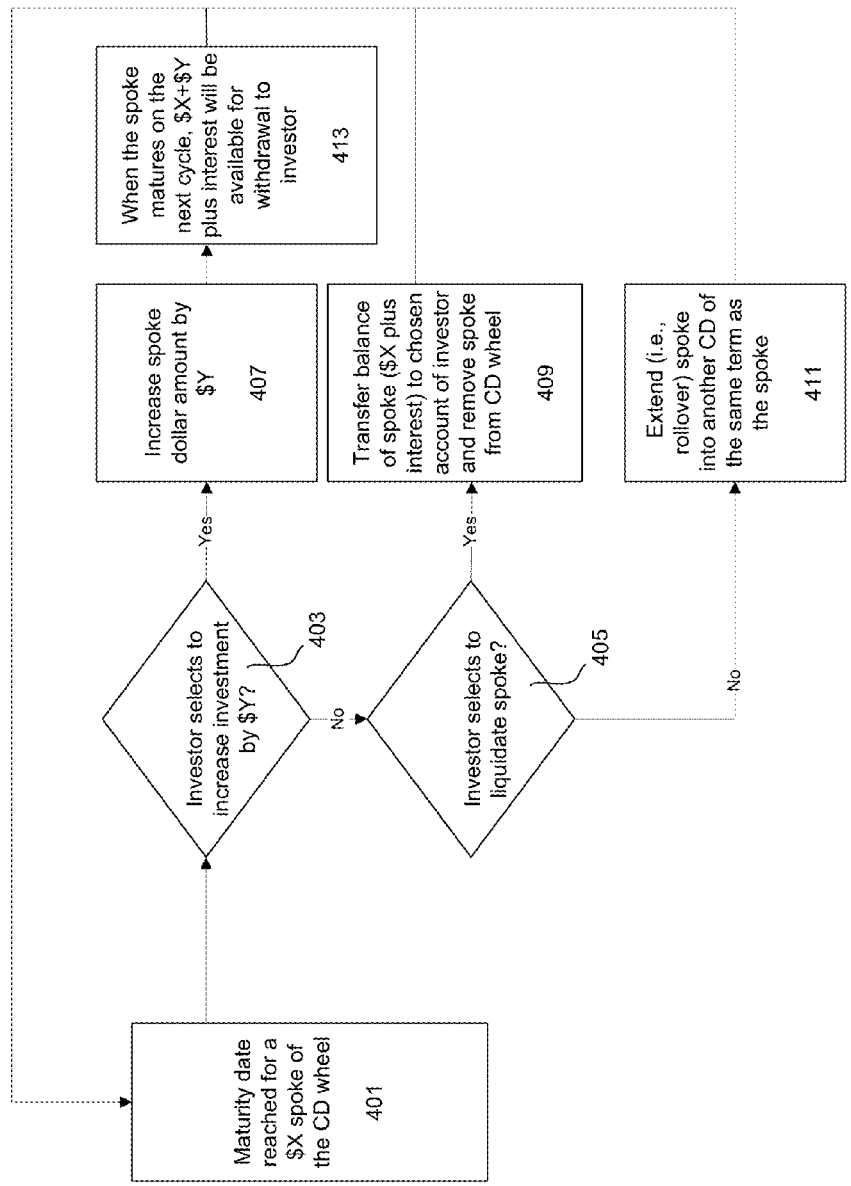
FIG. 4 is a is a flow chart illustrating an example process for automatic certificate of deposit investing.

Referring next to FIG. 4, shown is a flow chart illustrating an example process for automatic certificate of deposit investing. For example, first, a maturity date is reached 401 for a $X spoke of a CD wheel. It is then determined 403 whether the investor selects to increase the investment by $Y. The investor may select such options and variable increased investment amounts, for example, to be effectuated automatically based on selections made online when managing their account. If the investor selected to increase the investment by $Y, then the dollar amount invested for that particular spoke is automatically increased 407 by $Y. When the spoke matures on the next cycle, $X+$Y plus interest will be made available 413 for withdrawal to the investor. If the investor has not selected to increase the investment, then it is determined 405 whether the investor has selected to liquidate the spoke. If the investor has selected to liquidate the spoke, then the balance of the particular spoke ($X plus interest) may be automatically transferred 409 to a chosen account of the investor and the particular spoke is removed from the CD wheel. If the has not selected to liquidate the spoke, then the spoke is extended 411 (i.e., rolled over) into another CD of the same term as the spoke. The process above then repeats for the next spoke existing in the wheel as it matures.

Figure 5:
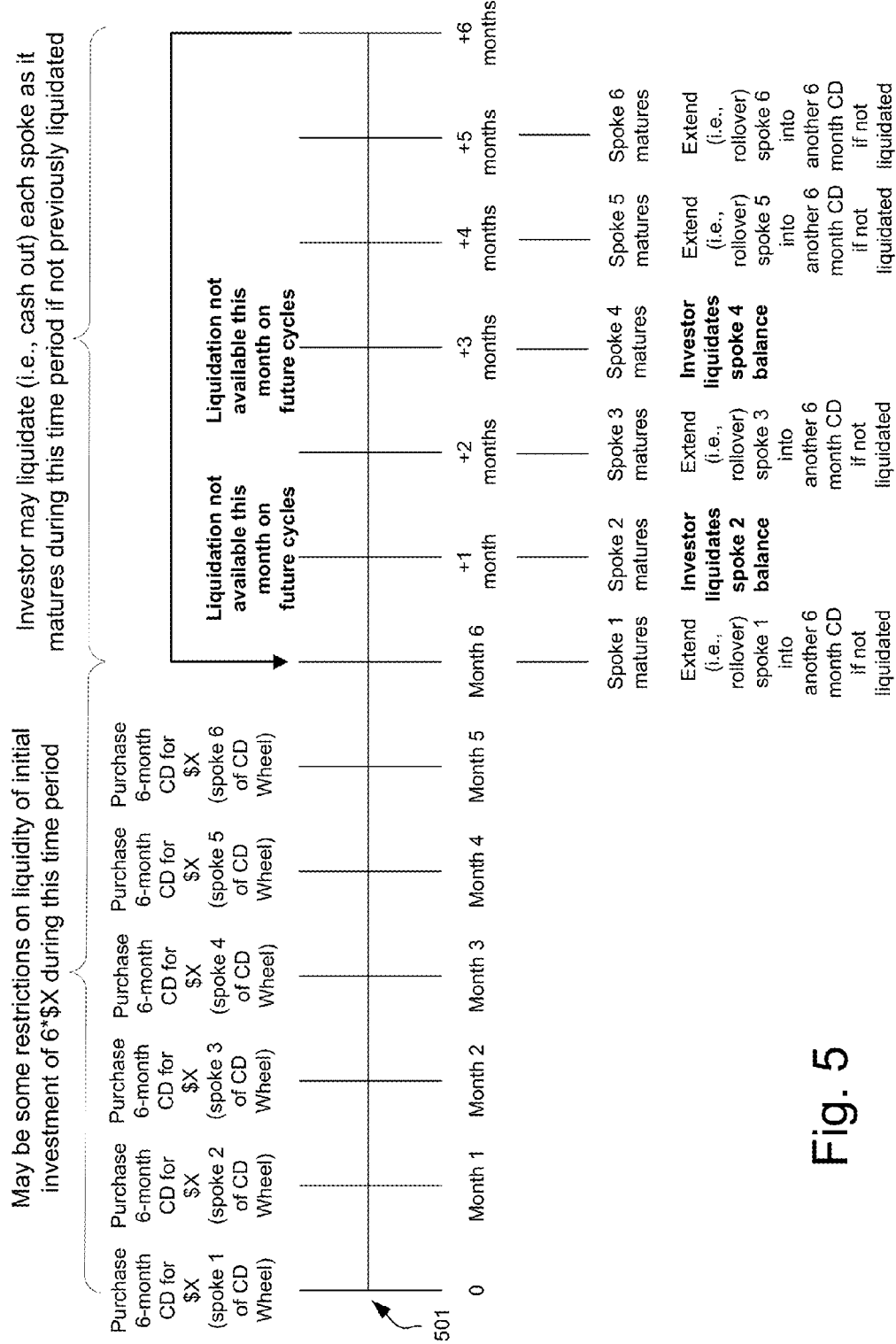
FIG. 5 is a timeline chart illustrating an example operation of a process for automatic certificate of deposit investing over time when an investor chooses to liquidate portions of the investment.

Referring next to FIG. 5, shown is a timeline chart illustrating an example operation of a process for automatic certificate of deposit investing over time when an investor chooses to liquidate portions of the investment (i.e., liquidate a spoke of the CD wheel). In the example provided, the investor has chosen to liquidate spokes 2 and 4 when they matured, thus, on the next cycle those spokes will not exist and thus no funds will be available for liquidation or withdrawal on what would have been the maturity dates of those spokes had the investor chosen not to liquidate them previously. In one embodiment, if the investor chooses to liquidate too many spokes (e.g., over a predetermined number of spokes or liquidates over a particular amount of the investment), then the CD wheel may be automatically converted back into traditional CDs and dissolved.

Figure 6:
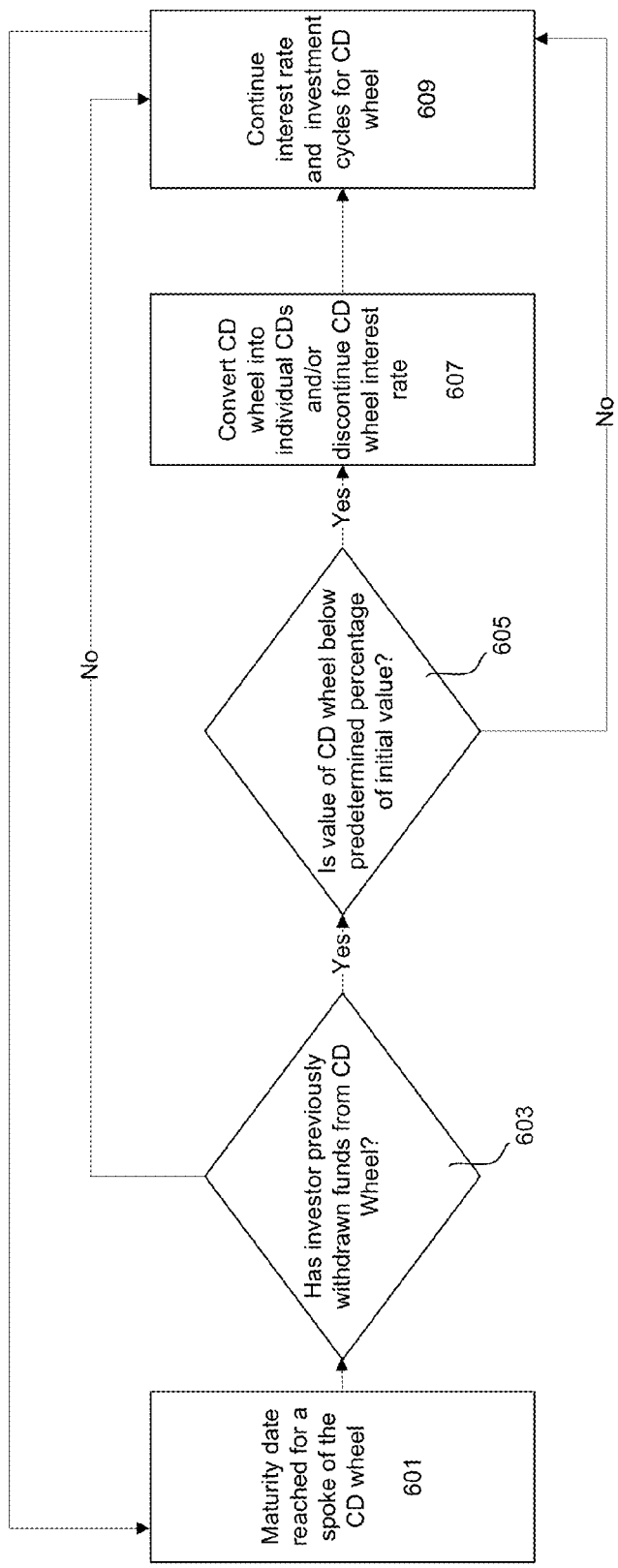
FIG. 6 is a is a flow chart illustrating an example process for automatically converting from automatic certificate of deposit investing into traditional certificate of deposit investing.

Referring next to FIG. 6, shown is a flow chart illustrating an example process for automatically converting from automatic certificate of deposit investing into traditional certificate of deposit investing (e.g., when the investor chooses to liquidate too much of the CD wheel). When a maturity date is reached 601 for a spoke of the CD wheel, it is automatically determined 603 whether the investor previously withdrawn funds from CD wheel. If the investor has not previously withdrawn funds from CD wheel, then the interest rate and investment cycles for the CD wheel are automatically continued 609. If the investor has previously withdrawn funds from CD wheel, then it is automatically determined 605 whether the value of the CD wheel is below a predetermined percentage of initial value of the CD wheel. If the value of the CD wheel is below the predetermined percentage of initial value of the CD wheel, then the CD wheel is converted 607 into individual traditional CDs and/or the CD wheel interest rate is lowered (i.e., discontinued). If the value of the CD wheel is not below the predetermined percentage of initial value of the CD wheel, then the interest rate and investment cycles for the CD wheel are automatically continued 609. The process above may then repeat for the next spoke existing in the wheel as it matures.

Figure 7:
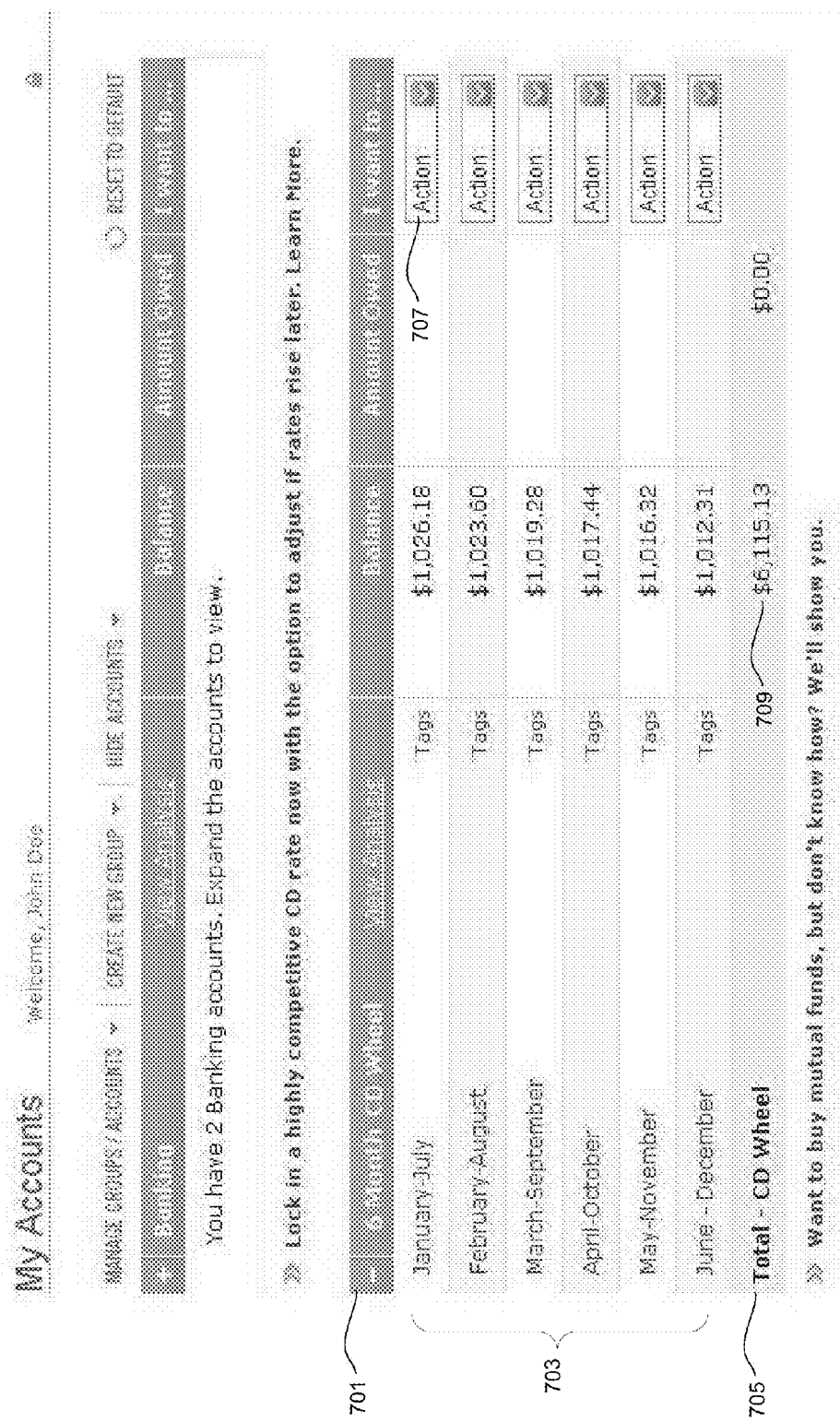
FIG. 7 is a diagram of an example user interface facilitating automatic certificate of deposit investing.

Referring next to FIG. 7, shown is a diagram of an example user interface facilitating automatic certificate of deposit investing. Shown on the interface is a view of an example CD wheel 701 as may be seen by the investor when they log into their account at a financial institution. In the example provided, shown are the spokes for a 6 month CD wheel with 6 spokes 703. Also shown is the total current value 709 of the CD wheel 701. This interface automatically updates with the values of each spoke and total CD wheel value as the values change and interest is calculated. Note also, that there are action menus 707 next to each spoke of the CD wheel for the investor to select various options that may be automatically implemented should the investor choose to do them using the interface menus 707. These options may include, but are not limited to: setting up a particular spoke to liquidate automatically after its maturity date is reached, electing to automatically increase by a certain dollar amount the investment into a particular spoke after its maturity date is reached, choosing to stop the initial purchase of the spoke, choosing to have the interest earned on the spoke automatically withdrawn after the maturity date, etc.

It is noted that the foregoing examples have been provided merely for the purposes of explanation and are in no way to be construed as limiting of the present invention. While the invention has been described with reference to various embodiments, it is understood that the words which have been used herein are words of description and illustration, rather than words of limitations. Further, although embodiments have been described herein with reference to particular means and materials, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A non-transitory computer-readable medium having computer-executable instructions stored thereon, wherein the computer-executable instructions comprise instructions for programming a processor to facilitate investing in certificates of deposit, the instructions comprising instructions for:

receiving a request to purchase a certificate of deposit wheel comprising more than one certificate of deposit each having the same term and the same period;

receiving an initial amount of funds from an investor;

setting an initial value of the certificate of deposit wheel equal to the initial amount of funds;

receiving, for the certificate of deposit wheel, an investor-selected term and period, wherein the period comprises the period between purchasing each of the more than one certificate of deposit;

purchasing each of the more than one certificate of deposit with the initial amount of funds based on the investor-selected term and period, wherein the purchasing comprises purchasing a last certificate of deposit prior to the maturation of a first purchased certificate of deposit;

providing, on a user interface, reinvestment election options for the value of each of the more than one certificate of deposit as each of the more than one certificate of deposit matures;

receiving a reinvestment election for each of the more than one certificate of deposit prior to the maturation of each of the more than one certificate of deposit;

reinvesting the value of each of the matured certificate of deposit according to the reinvestment election;

updating, on the user interface, a value of the certificate of deposit wheel as each of the more than one certificate of deposit matures;

determining the value of the certificate of deposit wheel;

dissolving the certificate of deposit wheel by converting the certificate of deposit wheel into individual certificates of deposit when the value of the certificate of deposit wheel is determined to be below a predetermined percentage of the initial value of the certificate of deposit wheel; and repeating the reinvesting step and the updating step when the value of the certificate of deposit wheel is determined to not be below the predetermined percentage of the initial value of the certificate of deposit wheel.

2. The non-transitory computer-readable medium of claim 1, wherein the reinvestment election comprises an election to reinvest, wherein the reinvesting the value of each of the matured certificate of deposit according to the reinvestment election comprises instructions for reinvesting at least a portion of the value of the matured certificate of deposit into a new certificate of deposit having the same term as the matured certificate of deposit.

3. The non-transitory computer-readable medium of claim 2, wherein the reinvestment election further comprises an election to increase investment by an additional amount of funds, wherein the reinvesting the value of the matured certificate of deposit according to the reinvestment election further comprises instructions for investing the additional amount of funds into the new certificate of deposit.

4. The non-transitory computer-readable medium of claim 1, wherein the reinvestment election comprises an election to liquidate, wherein the reinvesting the value of each of the matured certificate of deposit according to the reinvestment election comprises instructions for liquidating the value of the certificate of deposit and depositing the value of the certificate of deposit into an account of the investor.

5. The non-transitory computer-readable medium of claim 1, further comprising instructions for receiving an investor-selected amount for each of the more than one certificate of deposit wherein the purchasing each of the more than one certificate of deposit is based on the investor-selected amount.

6. The non-transitory computer-readable medium of claim 1, wherein any portion of the initial amount of funds may not be returned to the investor before a maturity date of the first purchased certificate of deposit without incurring monetary penalties, wherein the monetary penalty comprises reducing an interest rate of one or more of the certificates of deposit purchased.

7. A system for facilitating investing in certificates of deposit, the system comprising:

a memory; and a processor in connection with the memory, the processor operable to execute software modules, the software modules comprising:

a module configured to receive a request to purchase a certificate of deposit wheel comprising more than one certificate of deposit each having the same term and the same period;

a module configured to receive an initial amount of funds from an investor;

a module configured to set an initial value of the certificate of deposit wheel equal to the initial amount of funds;

a module configured to receive, for the certificate of deposit wheel, an investor-selected term and period, wherein the period comprises the period between purchasing each of the more than one certificate of deposit;

a module configured to purchase each of the more than one certificate of deposit with the initial amount of funds based on the investor-selected term and period, wherein the purchasing comprises purchasing a last certificate of deposit prior to the maturation of a first purchased certificate of deposit;

a module configured to provide, on a user interface, reinvestment election options for the value of each of the more than one certificate of deposit as each of the more than one certificate of deposit matures;

a module configured to receive a reinvestment election for each of the more than one certificate of deposit prior to the maturation of each of the more than one certificate of deposit;

a module configured to reinvest the value of each of the matured certificate of deposit according to the reinvestment election;

a module configured to update, on the user interface, a value of certificate of deposit wheel as each of the more than one certificate of deposit matures;

a module configured to dissolve the certificate of deposit wheel by converting the certificate of deposit wheel into individual certificates of deposit when the updated value of the certificate of deposit wheel is below a predetermined percentage of the initial value of the certificate of deposit wheel; and a module configured to repeat the reinvesting step and the updating step when the updated value of the certificate of deposit wheel is not below the predetermined percentage of the initial value of the certificate of deposit wheel.

8. The system of claim 7, wherein the reinvestment election comprises an election to reinvest, wherein the module configured to reinvest the value of each of the matured certificate of deposit according to the reinvestment election is further configured to reinvest at least a portion of the value of the matured certificate of deposit into a new certificate of deposit having the same term as the matured certificate of deposit.

9. The system of claim 8, wherein the reinvestment election further comprises an election to increase investment by an additional amount of funds, wherein the module configured to reinvest the value of the matured certificate of deposit according to the reinvestment election is further configured to invest the additional amount of funds into the new certificate of deposit.

10. The system of claim 7, wherein the reinvestment election comprises an election to liquidate, wherein the module configured to reinvest the value of each of the matured certificate of deposit according to the reinvestment election is further configured to liquidate the value of the certificate of deposit and deposit the value of the certificate of deposit into an account of the investor.

11. The system of claim 7, wherein the software modules further comprise a module configured to receive an investor-selected amount for each of the more than one certificate of deposit, wherein the module configured to purchase the each of the more than one certificate of deposit is further configured to purchase the each of the more than one certificate of deposit based on the investor-selected amount.

12. The system of claim 7, wherein any portion of the initial amount of funds may not be returned to the investor before a maturity date of the first purchased certificate of deposit without incurring monetary penalties, wherein the monetary penalty comprises reducing an interest rate of one or more of the certificates of deposit purchased.

13. A method of facilitating investing in certificates of deposit using a computer, the method comprising:

receiving a request to purchase a certificate of deposit wheel comprising more than one certificate of deposit each having the same term and the same period;

receiving, via a processor, an initial amount of funds from an investor;

setting an initial value of the certificate of deposit wheel equal to the initial amount of funds;

receiving, via the processor, for the certificate of deposit wheel, an investor-selected term and period, wherein the period comprises the period between purchasing each of the more than one certificate of deposit;

purchasing, via the processor, of deposit with the initial amount of funds based on the investor-selected term and period, wherein the purchasing comprises purchasing a last certificate of deposit prior to the maturation of a first purchased certificate of deposit;

providing, on a user interface, reinvestment election options for the value of each of the more than one certificate of deposit as each of the more than one certificate of deposit matures;

receiving, via the processor, a reinvestment election for each of the more than one certificate of deposit prior to the maturation of each of the more than one certificate of deposit;

reinvesting, via the processor, the value of each of the matured certificate of deposit according to the reinvestment election;

updating, on the user interface, a value of the certificate of deposit wheel as each of the more than one certificate of deposit matures;

determining the value of the certificate of deposit wheel;

dissolving, via the processor, the certificate of deposit wheel by converting the certificate of deposit wheel into individual certificates of deposit when the value of the certificate of deposit wheel is determined to be below a predetermined percentage of the initial value of the certificate of deposit wheel; and repeating the reinvesting step and the updating step when the value of the certificate of deposit wheel is determined to not be below the predetermined percentage of the initial value of the certificate of deposit wheel.

14. The method of claim 13, wherein the reinvestment election comprises an election to reinvest, wherein the reinvesting the value of each of the matured certificate of deposit according to the reinvestment election comprises reinvesting at least a portion of the value of the matured certificate of deposit into a new certificate of deposit having the same term as the matured certificate of deposit.

15. The method of claim 14, wherein the reinvestment election further comprises an election to increase investment by an additional amount of funds, wherein the reinvesting the value of the matured certificate of deposit according to the reinvestment election further comprises investing the additional amount of funds into the new certificate of deposit.

16. The method of claim 13, wherein the reinvestment election comprises an election to liquidate, wherein the reinvesting the funds according to the reinvestment election comprises liquidating the value of each of the certificate of deposit and depositing the value of the certificate of deposit into an account of the investor.

17. The method of claim 13, further comprising receiving an investor-selected amount for each of the more than one certificate of deposit, wherein the purchasing each of the more than one certificate of deposit is based on the investor-selected amount.

18. The method of claim 13, wherein any portion of the initial amount of funds may not be returned to the investor before a maturity date of the first purchased certificate of deposit without incurring monetary penalties, wherein the monetary penalty comprises reducing an interest rate of one or more of the certificates of deposit purchased.

* * * * *